US009952788B2

(12) United States Patent
Huang

(10) Patent No.: US 9,952,788 B2
(45) Date of Patent: Apr. 24, 2018

(54) METHOD AND APPARATUS FOR PROVIDING A SHARED NONVOLATILE MEMORY SYSTEM USING A DISTRIBUTED FTL SCHEME

(71) Applicant: Yiren Ronnie Huang, San Jose, CA (US)

(72) Inventor: Yiren Ronnie Huang, San Jose, CA (US)

(73) Assignee: CNEX Labs, INC., San Jose, CA (US)

( * ) Notice: Subject to any disclaimer, the term of this patent is extended or adjusted under 35 U.S.C. 154(b) by 24 days.

(21) Appl. No.: 15/278,833

(22) Filed: Sep. 28, 2016

(65) Prior Publication Data

US 2017/0090794 A1 Mar. 30, 2017

Related U.S. Application Data

(60) Provisional application No. 62/234,549, filed on Sep. 29, 2015.

(51) Int. Cl.
*G06F 3/06* (2006.01)

(52) U.S. Cl.
CPC .......... *G06F 3/0619* (2013.01); *G06F 3/0637* (2013.01); *G06F 3/0679* (2013.01); *G06F 3/0659* (2013.01)

(58) Field of Classification Search
None
See application file for complete search history.

(56) References Cited

U.S. PATENT DOCUMENTS

| 5,398,331 | A | * | 3/1995 | Huang | G06F 11/1633 |
| | | | | | 714/12 |
| 5,819,087 | A | * | 10/1998 | Le | G06F 9/4401 |
| | | | | | 710/10 |
| 5,848,367 | A | * | 12/1998 | Lotocky | G06F 11/1417 |
| | | | | | 701/36 |
| 2006/0053252 | A1 | * | 3/2006 | Ghezzi | G06F 3/0626 |
| | | | | | 711/115 |
| 2012/0198129 | A1 | * | 8/2012 | Van Aken | G06F 12/0246 |
| | | | | | 711/103 |

FOREIGN PATENT DOCUMENTS

EP 0367702 A2 * 5/1990 ........... G06F 3/0601

* cited by examiner

*Primary Examiner* — Edward J Dudek, Jr.
*Assistant Examiner* — Ralph A Verderamo, III
(74) *Attorney, Agent, or Firm* — James M. Wu; JW Law Group

(57) ABSTRACT

One embodiment of the present invention discloses a shared non-volatile memory ("NVM") system using a distributed flash translation layer ("FTL") scheme capable of facilitating data storage between multiple hosts and NVM devices. A process of shared NVM system includes an NVM management module or memory controller able to receive a request from a host for reserving a write ownership. The write ownership allows a host to write information to a portion of storage space in an NVM device. Upon identifying availability of the write ownership associated with the NVM device in accordance with a set of predefined policy stored in the NVM management module, the request is granted to the host if the write ownership is available. The host is subsequently allowed to fetch the FTL snapshot from the NVM device for the write operation.

20 Claims, 9 Drawing Sheets

METHOD AND APPARATUS FOR PROVIDING A SHARED NONVOLATILE MEMORY SYSTEM USING A DISTRIBUTED FTL SCHEME

PRIORITY

This application claims the benefit of priority based upon U.S. Provisional Patent Application having an application Ser. No. 62/234,549, filed on Sep. 29, 2015, and entitled "Distributed Flash Translation Layer (FTL) Scheme in Hosts Shared Nonvolatile Memory System" which is hereby incorporated herein by reference in its entirety.

FIELD

The exemplary embodiment(s) of the present invention relates to the field of semiconductor and integrated circuits. More specifically, the exemplary embodiment(s) of the present invention relates to storage and/or non-volatile memory devices.

BACKGROUND

A typical solid-state drive ("SSD"), which is also known as a solid-state disk, is, for example, a data storage memory device for persistently remember stored information or data. A conventional SSD technology, for instance, employs a set of standardized user or device interfaces to allow other systems to access its storage capacities. The standardized interfaces or input/output ("I/O") standards generally are compatible with traditional I/O interfaces for other non-volatile memories such as hard disk drives. In one example, SSD uses non-volatile memory components to store and retrieve data for one or more processing systems.

To communicate with various different types of computing systems, a set of standard interfaces is deployed. To manage storing information, SSD typically includes a flash translation layer ("FTL") which is used as a flash file system. A flash file system, for example, is a file system used for managing files on flash-based storage devices.

With increasing popularity of non-volatile memory ("NVM") storage capacity, an NVM device or a group of NVM devices is often accessed or shared by multiple systems. A problem, however, associated with a conventional approach for sharing a set of group NVM devices is that it is typically difficult to keep data integrity when multiple hosts write different information to the same NVM device at the same time.

SUMMARY

One embodiment of the present invention discloses a shared non-volatile memory ("NVM") system using a distributed flash translation layer ("FTL") scheme capable of facilitating data storage between multiple hosts and multiple NVM devices. In one aspect, the process of a shared NVM system includes an NVM management module or memory controller capable of receiving a request from a host for reserving a write ownership. A write ownership allows a host to write information to at least a portion of storage space in an identified NVM device. Upon identifying the availability of the write ownership associated with the NVM device in accordance with a set of predefined policy stored in the NVM management module, the request is granted if the write ownership is available for reserve. The host is subsequently allowed to fetch the FTL snapshot from the NVM device for the write operation.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
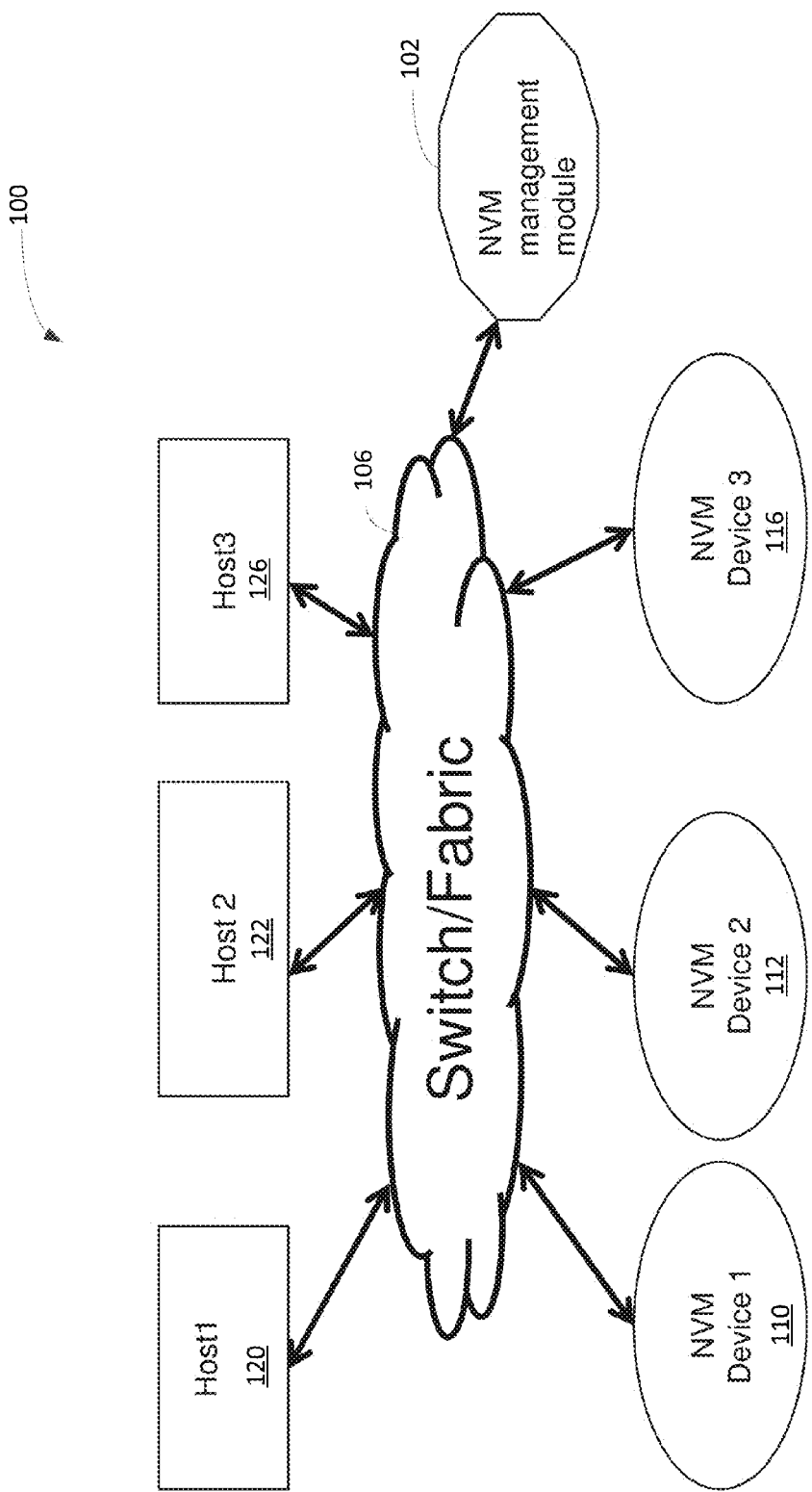
FIG. 1 is a block diagram illustrating a shared non-volatile memory ("NVM") storage system using a distributed flash translation layer ("FTL") scheme in accordance with one embodiment of the present invention.

Exemplary embodiment(s) of the present invention is described herein in the context of a method, system and apparatus of providing a shared non-volatile memory ("NVM") system capable of providing storage services to various hosts using a distributed flash translation layer ("FTL") scheme.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), Flash Memory, PCM (phase-change memory), Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "scheme," "method", "task", and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

In one embodiment, the presently described invention includes a shared NVM system which includes multiple hosts, NVM devices, at least one NVM management module, and a switching fabric. A function of the switching fabric is to connect hosts, NVM devices, and NVM management module. The NVM management module, in one example, is an NVM memory controller which is configured to manage the shared memory system using a distributed FTL scheme. In one aspect, the process of a shared NVM system is capable of receiving a request from any of the connected hosts for reserving a write ownership or a write operation to a specific NVM device. A write ownership allows a host to write information or data to at least a portion of storage space in an NVM device with minimal data contention. Upon identifying availability of the write ownership associated with the NVM device in accordance with a set of predefined policy stored in the NVM management module, the request should be granted if the write ownership is available for reserve. The host is subsequently allowed to fetch the latest version of FTL snapshot from the NVM device before the write operation is carried out.

FIG. 1 is a block diagram 100 illustrating a shared NVM storage system using a distributed FTL scheme in accordance with one embodiment of the present invention. Diagram 100 includes hosts 120-126, NVM devices 110-116, NVM management module 102, and switching fabric 106. Hosts 120-126, in one example, can be computer, servers, portable devices, laptops, smart phones, tablets, or a combination of computers, servers, portable devices, laptops, smart phones, and/or tablets. NVM management module 102, in one aspect, is a memory controller, controller module, storage manager, and/or storage control system and is configured to facilitate data storage. It should be noted that the underlying concept of the exemplary embodiment(s) of the present invention would not change if one or more blocks (or devices) were added to or removed from diagram 100.

A function of a shared NVM storage system is to provide data storage persistently for various connected systems such as hosts 120-126. Each host such as host 1 or host 120 is able to interface with one or more users or hosts, and is capable of processing and storing data based on the instruction(s) from the user(s). Hosts 120-126, in one example, can be computers, laptops, portable devices, servers, cars, smart-phones, and/or a cluster of mixed computers, laptops, portable devices, servers, cars, or smartphones.

Switching fabric 106 is a connection network capable of facilitating communications between connected devices such as hosts 120-126 and NVM devices 110-116. Depending on the applications, switching fabric 106 can be a group of wires, lines, cables, and/or wireless channels used for interconnecting systems and/or devices. Switching fabric 106, in another example, can be a smart coupling network capable of dynamically connecting, routing, throttling, searching, and/or terminating connected devices. For example, switching fabric 106 may include NVM express ("NVMe"), Peripheral Component Interconnect Express ("PCI Express or PCIe"), or a combination of NVMe and PCIe. It should be noted that other types of switching fabric or switches may be used as long as they satisfy the requirements of a particular application. For instance, switching fabric 106 contains a cluster of interconnections used to facilitate communication between NVM devices 110-116 and hosts 120-126.

NVM devices 110-116 include a set of storage devices capable of storing data persistently. In one aspect, flash memory based storage device is used as NVM devices 110-116. Alternatively, NVM devices 110-116 can also include NVM cells as well as volatile memory cells such as SRAM and/or RAM. Note that NVM devices such as NVM device 1 and NVM device 2 are placed remotely connected via switching fabric 106 and/or communications network(s).

NVM management module 102, in one embodiment, manages and/or facilitates memory read and memory write including a process of write ownerships reservation. Before a host can write information to a specific NVM device, the host is required to first reserve the write ownership. To acquire the write ownership, the host sends a reservation request to a memory controller such as NVM management module 102 requesting the write ownership to a specific NVM device such as NVM device 116. For example, host 126 sends a request to NVM management module 102 requesting a write ownership to NVM device 110. NVM management module 102, in one example, manages or facilitates which user or host can write to NVM device 110. A function of NVM management module 102 is to facilitate memory access to a shared NVM storage between multiple hosts and multiple NVM devices through a distributed FTL cache scheme. A distributed FTL cache scheme, in one embodiment, is a process of using FTL tables or snapshots passing between the hosts and NVM devices to maintain data integrity between multiple hosts accessing multiple NVM devices. Note that memory access includes activities relating to memory write and/or memory read.

In operation, host 3, for example, sends a write ownership request to NVM management module 102 requesting a write operation to NVM device 116. After checking the policy table and status table, NVM management module 102 grants the request to host 3. NVM management module 102 subsequently notifies NVM device 116 indicating recently granted write ownership to host 3. Host 3 proceeds to upload a latest version of FTL from NVM device 116 and saves the FTL in its cache memory. Host 3 updates the FTL stored in cache to reflect data stored in NVM device 116. After completion of write operation, host 3 replaces the FTL in NVM device 116 with updated FTL in the cache in NVM management 102. Once the FTL is updated, NVM management module 102 and/or other devices are notified.

An advantage of using a shared NVM system with a distributed FTL cache scheme is to allow multiple hosts to dynamically access multiple NVM devices while maintaining data integrity.

Figure 2:
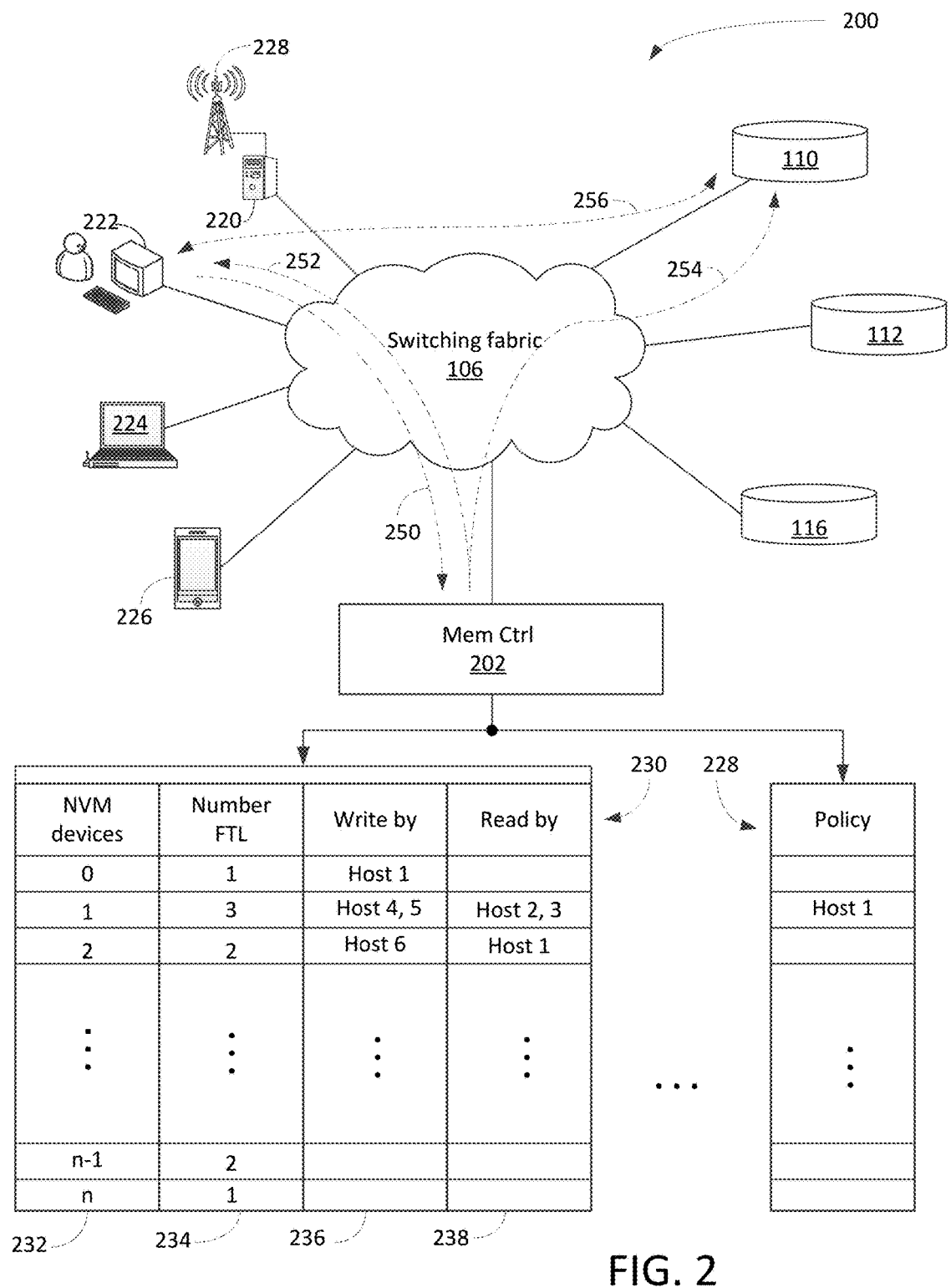
FIG. 2 is a block diagram illustrating a memory controller capable of providing a distributed FTL scheme in accordance with one embodiment of the present invention.

FIG. 2 is a block diagram 200 illustrating a memory controller or NVM management module capable of providing a distributed FTL scheme in accordance with one embodiment of the present invention. Diagram 200, which is similar to diagram 100, includes hosts 220-226, NVM devices 110-116, NVM management module 202, and switching fabric 106. Hosts 220-226, in one example, can be server 220, computer 222, laptop 224, and smart phone 226, wherein server 220 is further coupled to a base station 228. NVM management module 202, in one aspect, is a memory controller or storage control system configured to manage which hosts have the permission to access which NVM devices. It should be noted that the underlying concept of the exemplary embodiment(s) of the present invention would not change if one or more blocks (or devices) were added to or removed from diagram 200.

Diagram 200, in one embodiment, discloses a shared NVM storage system that enables any of hosts 220-226 to access any of NVM devices 110-116 using a distributed FTL cache scheme. In one aspect, NVM management module 202 uses FTL to transmit access and/or write information between the hosts. For example, upon receipt of a reservation quest for input output ("IO") write ownership for one or more NVM devices, NVM management module 202 uses stored information associated with FTL to identify the current status of the targeted or specified NVM device. After identifying the availability of write ownership to the targeted NVM device, a write ownership to at least a portion of the NVM device is granted to the host if the write ownership is available for reserve.

The switching fabric can be a network, local area network (LAN), and/or computer networking. Alternatively, the switching fabric can be a part of a computing system containing multiple hosts and NVM devices, such as a mainframe computer or a server farm. Switching fabric 106, in one example, includes switches in a node or clouds, hardware, wires, cables, integrated circuits ("ICs"), and/or programs that permit communication connections to be controlled.

Distributed FTL processing, in one embodiment, requires each host or host CPU to reserve IO write ownership before a write operation as well as each host CPU to reserve IO read access. Such reservations, in one embodiment, are being managed and/or controlled by a central NVM management module such as NVM management module 202. Alternatively, NVM management module 202 can reside in an NVM device or every NVM device.

To facilitate reservation of each IO write ownership, NVM management module 202, in one embodiment, includes a status table 230 and policy table 228. Policy table 228, in one embodiment, contains access rules used to indicate whether NVM device 110 can be read or write by smart phone 226. For example, rule for a particular NVM device can specifically prevent any data modification except by NVM management module 202. The rules in policy table 228 can be established by data, authentication process, restrictions, and the like. The rules can also be provided by users and/or subscribers. For instance, a subscriber or user who owns a device such as NVM device 112 can place a restriction preventing host 220 to access NVM device 112.

Status table 230, in one embodiment, includes an NVM device section 232, number of FTL section 234, write section 236, and read section 238. Depending on the applications, additional sections can be added or deleted. While NVM device section 232 contains a list of active NVM devices, number of FTL 234 contains a list of available FTL versions corresponding to listed NVM devices. Write section 236 lists a list of hosts that are current writing to a set of specified NVM devices and read section 238 stores a list of hosts that is currently reading from a group of identified NVM devices. For example, NVM device 0 contains one (1) FTL version and currently is written by host 1. Also, NVM device 1, for instance, contains three (3) versions of FTL and it is currently being written by host 4 and 5 and is also being read by host 2 and 3.

During an operation, host 222 issues a memory access request to NVM management module 202 requesting access to NVM device 110 via switching fabric 106 as indicated by numeral 250. After verifying access availability with status table 230 and policy table 228, the request is granted. NVM management module 202 sends a grant message to host 222 as indicated by numeral 252 and sends a reservation notification to NVM device 110 notifying the grant as indicated by numeral 254. Upon receipt of reservation notification, NVM device 110 allows host 222 to load the latest version of FTL from NVM device 110 to host 222 as indicated by numeral 256.

An advantage of using a set of tables such as status table 230 and policy table 228 within NVM management module 202 is that it allows NVM management module 202 to manage access reservation and distributed FTL scheme.

Figure 3:
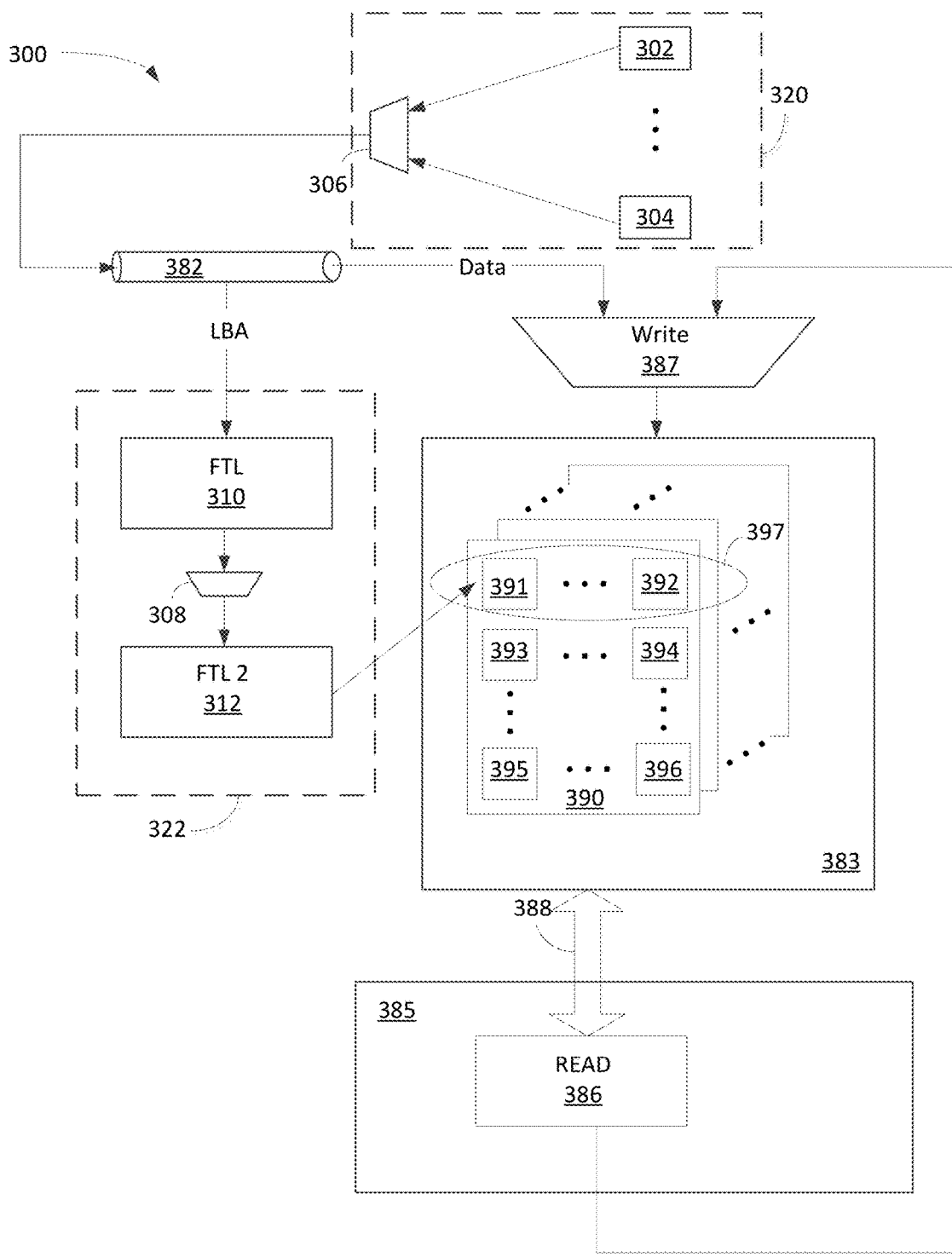
FIG. 3 is a block diagram illustrating an NVM storage device having multiple FTLs and able to store information persistently in accordance with one embodiment of the present invention.

FIG. 3 is a block diagram 300 illustrating an NVM storage device having multiple FTLs and able to store information persistently in accordance with one embodiment of the present invention. Diagram 300 includes input data 382, storage device 383, output port 388, and a group of hosts 320. In one embodiment, storage device 383 further includes FTL 322 used for data access. In one aspect, FTL 322 includes FTL 310 as a new version of FTL and FTL 312 as a current version of FTL. A function of FTL is to map logical block addresses ("LBAs") to physical addresses. It should be noted that the underlying concept of the exemplary embodiment(s) of the present invention would not change if one or more blocks (or devices) were added to or removed from diagram 300.

Storage device 383, in one embodiment, is a flash memory based NVM for storing data persistently. The flash memory based NVM storage device such as SSD generally includes multiple arrays of flash memory cells for data storage. The flash memory, which generally has a read latency less than 300 microseconds ("μs"), is organized in blocks and pages wherein a minimum access unit, for example, can be set to four (4) kilobyte ("Kbyte"), eight (8) Kbyte, or sixteen (16) Kbyte memory capacity depending on the flash memory technologies. Other types of NV memory, such as phase change memory ("PCM"), magnetic RAM ("MRAM"), STT-MRAM, or ReRAM, can also be used in storage device 383. To simplify the forgoing discussion, the flash memory or flash memory based SSD is herein used as an exemplary NV storage device. Also, a four (4) Kbyte page or flash memory page ("FMP") is used for the forgoing discussion.

The SSD includes multiple NVM or FMBs 390, FTLs 322, and storage controller 385. Each of FMBs 390 further includes a set of pages 391-396 wherein each page such as page 391 has a block size of 4096 bytes or 4 Kbyte. In one example, FMBs 390 can contain from 128 to 512 pages or sectors or blocks 391-396. A page or block is generally a minimal writable unit. Flash memory 383 is able to persistently retain information or data for a long period of time without power supply.

Each FTL such as FTL 312 includes a FTL database or table that stores mapping information. For example, the size of FTL database is generally a positive proportion to the total size of SSD storage capacity. For instance, one way to implement the FTL in SSD is that it uses a DRAM size that approximately equals to ⅟1000 of SSD capacity. For example, because each FMP may be 4 Kbyte and each entry of FTL database is 4 byte, the size of FTL database can be calculated as SSD capacity/4 KByte*4 Byte (SSD capacity/1000) which is approximately 1 over 1000 (or ⅟1000).

To provide a shared NVM storage system, hosts 320-304 can access storage device 383 via selector 306. Selector 306, in one aspect, is controlled by a memory controller 385 also known as NVM management module. For implementing simultaneous read and write operations to a single NVM device, multiple versions of FTL are used. For example, while current version of FTL is used for reading operation by a set of hosts, a new version of FTL is being built by a write operation from another host(s). Once the write operation is completed, the new version of FTL such as FTL 310 is written to the current version of FTL such as FTL 312. Note that additional FTL version(s) can be implemented to facilitate multiple concurrent write operations to different sections of the NVM device at the same time.

In operation, upon receipt of data input or data packets 382, FTL 322 maps LBA to PPA in storage device 383. After identifying PPA, write circuit 387 writes the data from data packets 382 to a page or pages within a block pointed by PPA. The data stored in storage device 383 can be refreshed using read module 386 via output port 388.

Figure 4:
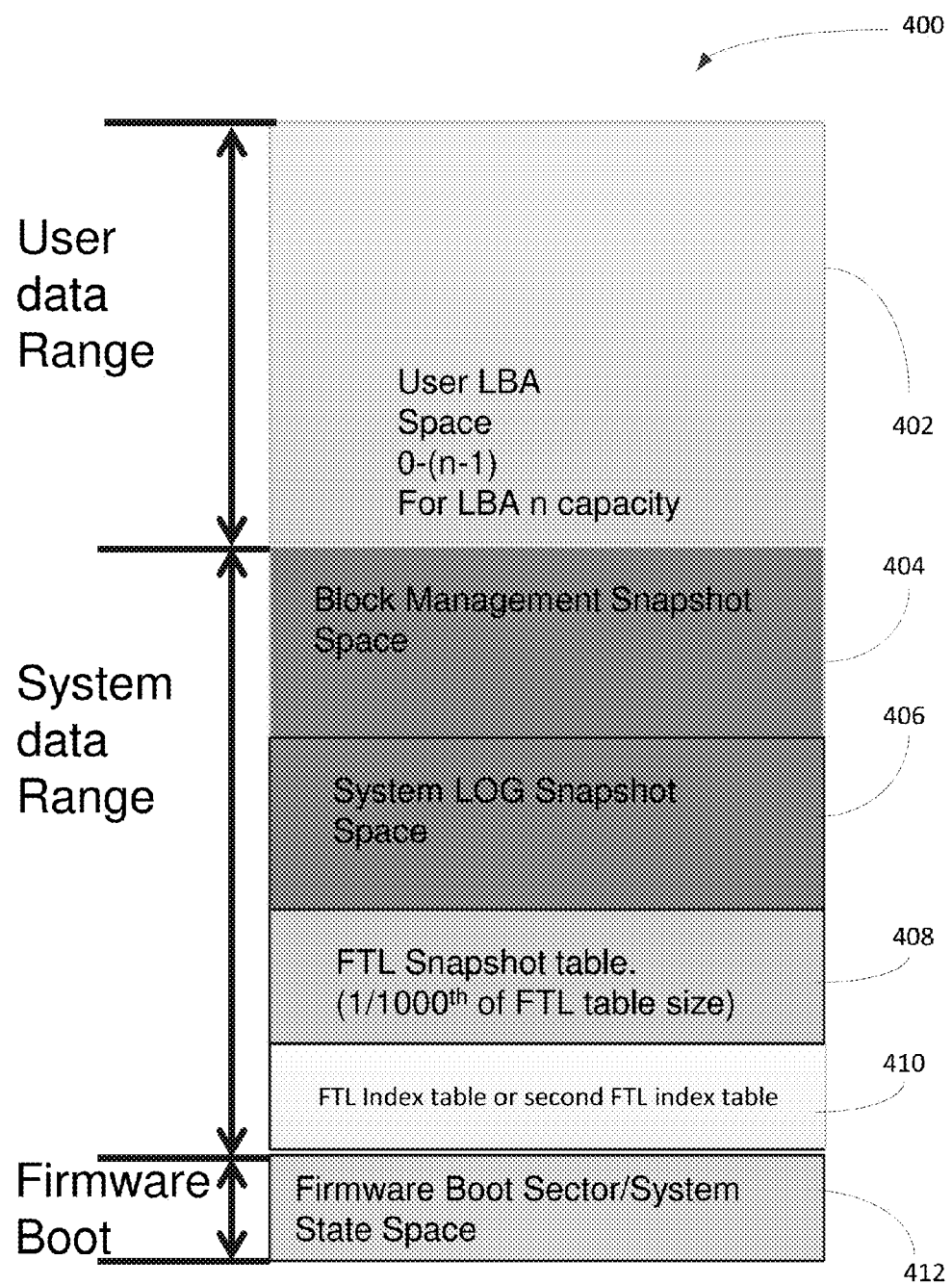
FIG. 4 is a block diagram illustrating storage regions in an NVM storage device capable of operating multiple FTL versions in accordance with one embodiment of the present invention.

FIG. 4 is a block diagram 400 illustrating storage regions in an NVM storage device capable of operating multiple FTL versions in accordance with one embodiment of the present invention. Diagram 400 shows an exemplary NVM storage capacity having a user data range, system data range, and a firmware boot range. The firmware boot range includes system state space 412 used for system boot and/or recovery. For example, firmware boot sector stores information in a storage space for system reboot. Alternatively, firmware can also use firmware space 412 for storing state variables for system reboot or power up. It should be noted that the underlying concept of the exemplary embodiment(s) of the present invention would not change if one or more blocks (or ranges) were added to or removed from diagram 400.

User data range includes user LBA space 402 with LBA n capacity where n is the total number of LBA or pages. LBA space 402 is configured to store user data. For example, the LBA mapped to LBA space 402 is the user LBA space from 1 to n−1 if the capacity of an NVM device drive has n pages or LBA. Note that the actual physical space allocated for user data range is usually n*(1+op1) where "op1" is the provision percentage for the user data range.

System data range, in one example, is divided into block management snapshot space 404, system log snapshot space, FTL snapshot table 408, and FTL index table 410. Space 404 is used for storing block management related information and space 406 logs system log snapshot for device management. FTL snapshot table maps LBA in response to FTL index table 410 which is further used to index FTL snapshot table. In one aspect, multiple versions of FTL such as current version FTL and new version of FTL can be implemented in space 410. While information relating to FTL table is used for FTL caching operation, system log snapshot and/or FTL information are used for system recovery. The LBA mapped to the system data range can be system LBA space from 1 to m−1 if the system data range is m, where m is the total pages or capacity of the system data range. The actual physical space allocated for the system data range, in one example, is m*(1+op2) where "op2" is the provision percentage for the system data range.

Figure 5:
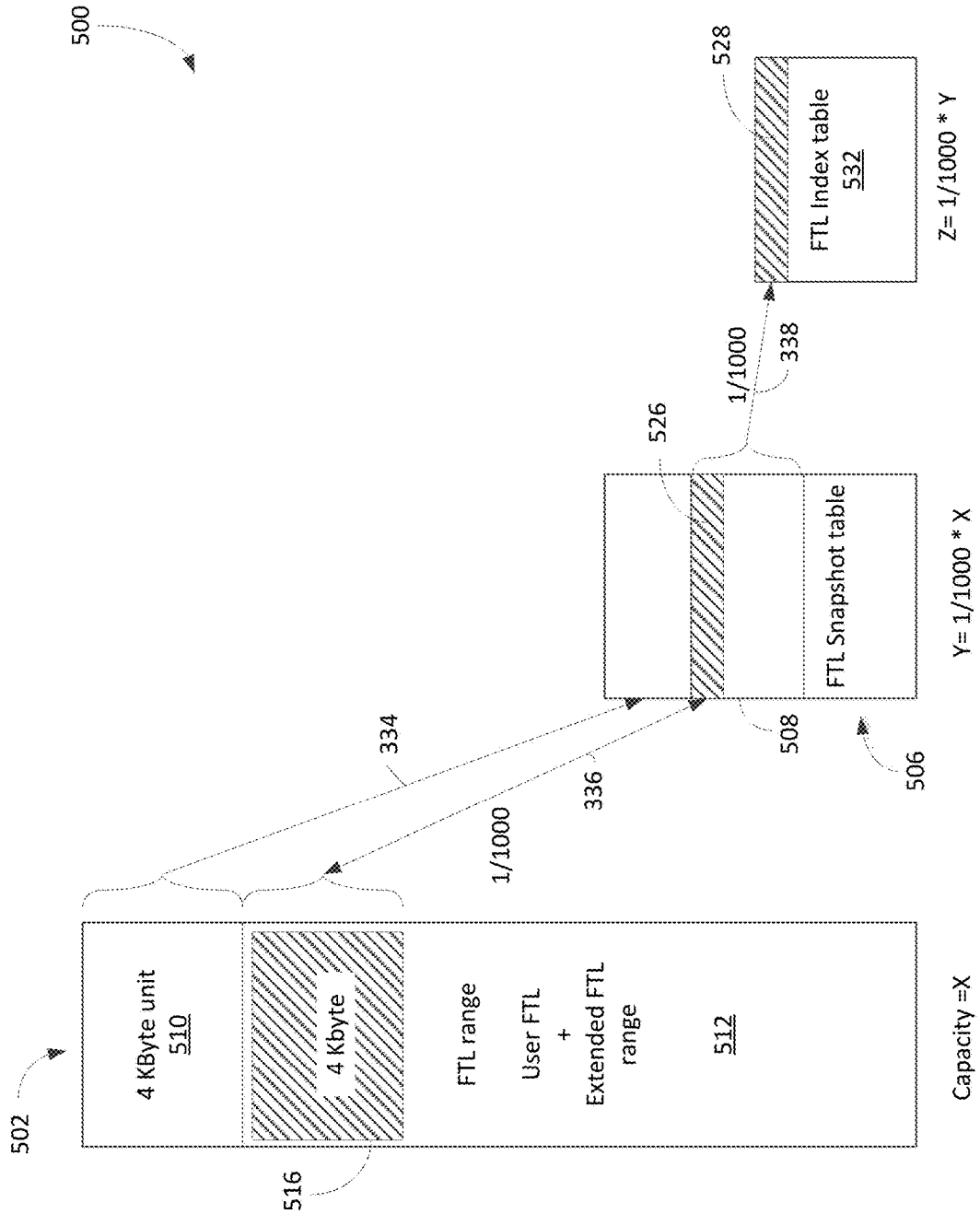
FIG. 5 is a logic diagram illustrating memory access in an NVM device using FTL tables in accordance with one embodiment of the present invention.

FIG. 5 is a logic diagram 500 illustrating memory access in an NVM device using FTL tables in accordance with one embodiment of the present invention. Diagram 500 includes a storage area 502, FTL snapshot table 506, and FTL index table 532 wherein storage area 502 includes storage range 512 and an extended range 510. Storage range 512 can be accessed by user through FTL range as well as extended FTL range. FTL snapshot table 506 is a stored FTL database at a giving time. In one embodiment, FTL snapshot table 506 is stored at extended FTL range 510 as indicated by numeral 334. It should be noted that the underlying concept of the exemplary embodiment(s) of the present invention would not change if one or more blocks (or ranges) were added to or removed from diagram 500.

Each entry of FTL database or FTL snapshot table such as entry 526 is set to a predefined number of bytes such as four (4) bytes. Entry 526 of FTL snapshot table 506, in one example, points to 4 Kbyte data unit 516 as indicated by numeral 336. FTL snapshot table 506 is approximately $1/1024^{th}$ of the LBA range which includes user and extended ranges (or storage area) 512. If storage area 512 has a capacity of X, FTL snapshot table 506 is $1/1000$ multiples with X. For example, if storage area 512 has a capacity of 512 gigabyte ("GB"), FTL snapshot table 506 should be approximately 512 megabyte ("MB") which is $1/1000 \times 512$ GB.

FTL index table 532 is approximately $1/1024^{th}$ of FTL snapshot table 506 since each entry 528 of FTL index table 532 points to 4 Kbyte entry 508 of FTL snapshot table 522. If FTL snapshot table has a capacity of Y which is X/1000 where X is the total capacity of storage area 512, FTL index table 532 is $1/1000$ multiples Y. For example, if FTL snapshot table 506 has a capacity of 512 MB, FTL index table 532 should be approximately 512 kilobyte ("KB") which is $1/1000 \times 512$ MB. In one embodiment, FTL index table 532 is used to reference or index FTL snapshot. FTL snapshot table 506, for example, is $1/1024^{th}$ of the LBA range including user and extended LBA ranges. Note that every 4-byte entry of PPA (physical page address) points to four (4) KByte data unit in the LBA range. FTL index table 532 should be $1/1024^{th}$ of the FTL snapshot table size. Each entry of the FTL index table will point to one 4-KByte or 1K entries in the FTL snapshot table. Before powering down, FTL index table 532 and FTL table 506 are saved or stored at space 516. Based on the stored FTL table, the FTL index table such as table 532 is loaded into the memory during a system boot up whether that is inside the host CPU memory or controller attached memory.

Figure 6:
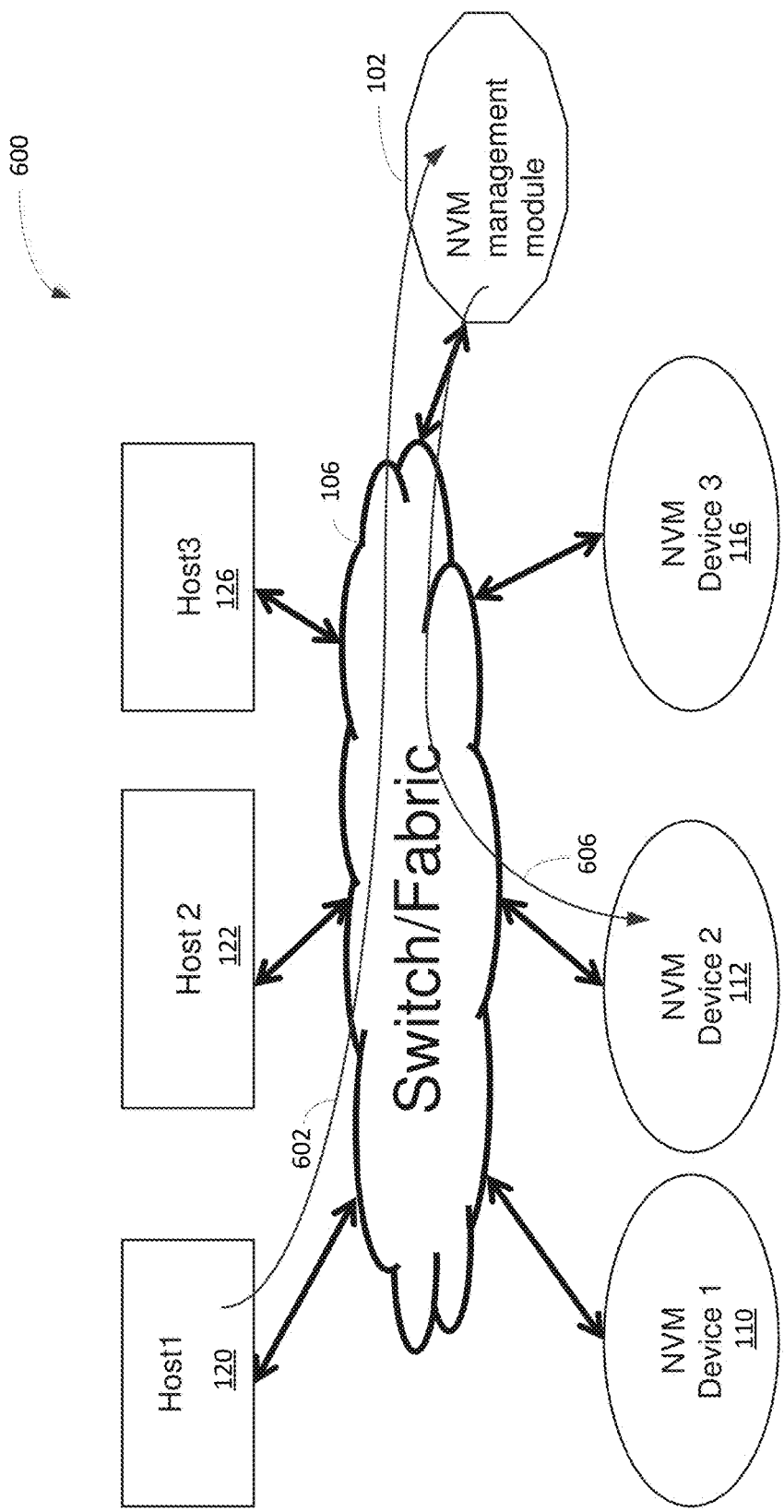
FIG. 6 is a logic diagram illustrating a shared memory operation using a distributed FTL scheme in accordance with one embodiment of the present invention.

FIG. 6 is a logic diagram 600 illustrating a shared memory operation using a distributed FTL scheme in accordance with one embodiment of the present invention. Diagram 600 is similar to diagram 100 except that diagram 600 illustrates an exemplary implementation of a shared NVM storage system with a distributed FTL cache process. To perform an IO write operation, the distributed FTL process, in one embodiment, executes a distributed FTL IO write reservation. Before a host or host CPU such as Host 1 can apply an IO write to an NVM device such as NVM device 2, the host is required to request of IO write ownership to a predefined LBA range on the NVM device such as NVM device 2. The reservation request is sent from host 1 to NVM management module 102 or a device containing memory controller as indicated by numeral 602. The reservation request is subsequently granted if no other reservation has been made for the same region (i.e., LBA range) of the NVM device. Upon granting the request to host 1, NVM management module 102 sends a notification of grant to NVM device 2 via a channel 606 within switching fabric 106 informing the write ownership reservation to host 1. It should be noted that the reservation request can be denied if there is a conflict, such as existing write reservation, read reservation, policy restriction, and the like.

Once host 1 receives the IO write reservation, the process proceeds to load the FTL snapshot from NVM device 2 to the FTL cache area of host 1 before the IO write operation. In one embodiment, the status table in NVM management module 102 is modified to reflect the recent IO write reservation associated with NVM device 2. The process also reads or maps LBA to NVM physical address. The process, for example, updates the FTL cache and mark the modified state as the data being stored in NVM device 2. When data or file is fully written with all the IO write commands applied, the latest or updated FTL snapshot is applied to the NVM device. Such FTL snapshot can also be applied based on the application's need to update the FTL table to NVM device whereby other hosts such as host 2 can also see the updated FTL in NVM device 2.

To perform an IO read processing, the read process sends a read reservation request to NVM management module 102. After granting the read ownership, host 1 loads the latest version of FTL from NVM device 2. In one example, the acquired FTL is stored in an FTL cache in the NVM device. Note that the FTL snapshot area is used to map LBA to NVM physical address space.

After applying the FTL snapshot back to NVM device, the host applies the FTL updated message to other hosts that are also registered to read the shared NVM device. The updated FTL message will invalidates the FTL cache on the other registered hosts currently reading the same NVM device. The registered hosts or host CPUs that are reading the shared NVM device will require reloading the FTL cache from the FTL snapshot area from the NVM device.

Figure 7:
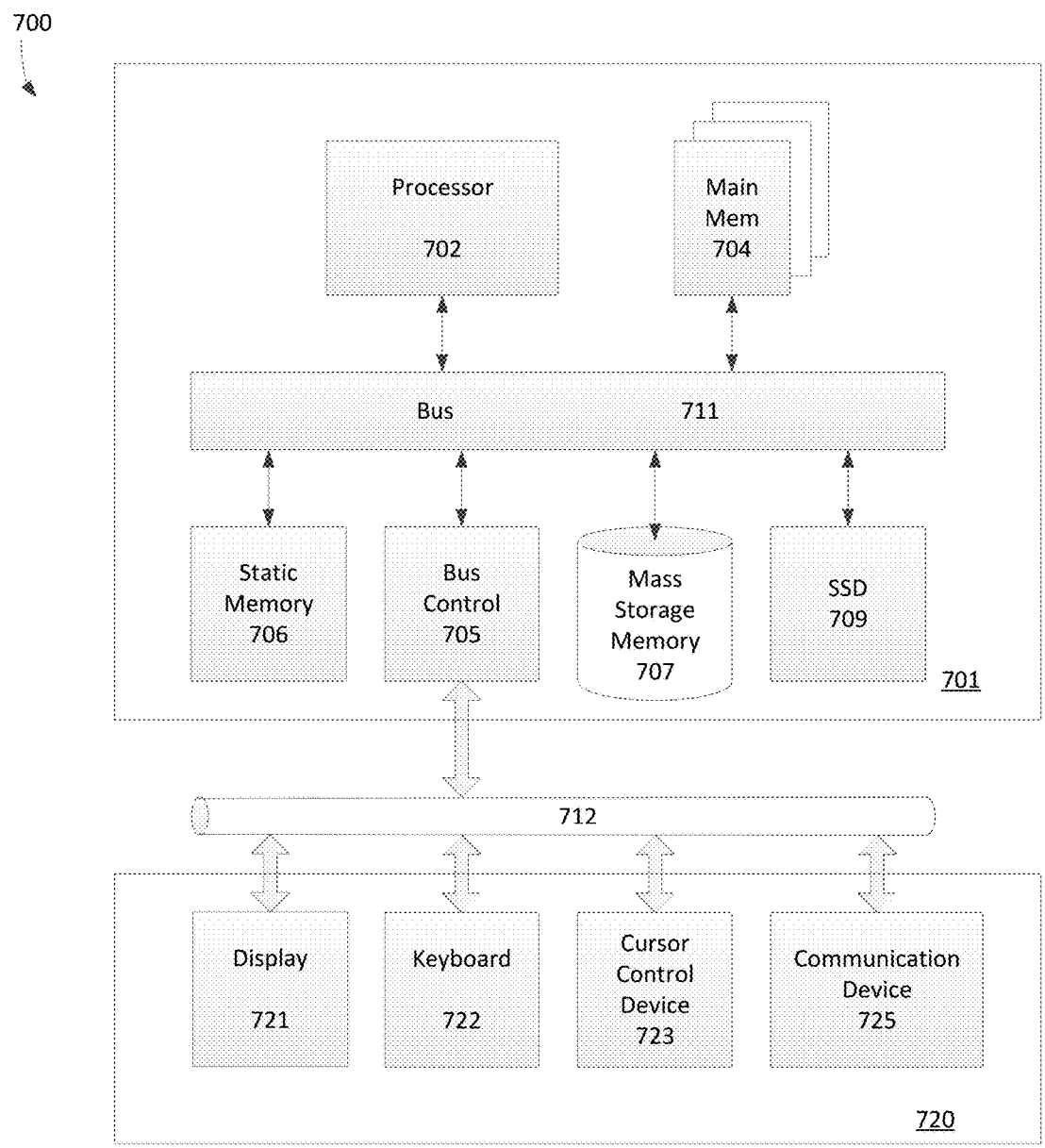
FIG. 7 is a block diagram illustrating a digital processing system which can be a host and/or a memory controller in accordance with one embodiment of the present invention.

FIG. 7 is a block diagram illustrating a digital processing system 700 which can be a host and/or a memory controller in accordance with one embodiment of the present invention. Computer system or SSD system 700 includes a CPU or processing unit 701, an interface bus 711, and an input/output ("IO") unit 720. Processing unit 701 includes processor 702, main memory 704, system bus 711, static memory device 706, bus control unit 705, mass storage memory 707, and SSD controller 709. It should be noted that the underlying concept of the exemplary embodiment(s) of the present invention would not change if one or more blocks (circuit or elements) were added to or removed from system 700.

Bus 711 is used to transmit information between various components and processor 702 for data processing. Processor 702 may be any of a wide variety of general-purpose processors, embedded processors, or microprocessors such as ARM® embedded processors, Intel® Core™2 Duo, Core™2 Quad, Xeon®, Pentium™ microprocessor, Motorola™ 68040, AMD® family processors, or Power PC™ microprocessor.

Main memory 704, which may include multiple levels of cache memories, stores frequently used data and instructions. Main memory 704 may be RAM (random access memory), PCM (phase-change memory), MRAM (magnetic RAM), or flash memory. Static memory 706 may be a ROM (read-only memory), which is coupled to bus 711, for storing static information and/or instructions. Bus control unit 705 is coupled to buses 711-712 and controls which component, such as main memory 704 or processor 702, can use the bus. Bus control unit 705 manages the communications between bus 711 and bus 712. Mass storage memory 707, which may be a magnetic disk, an optical disk, hard disk drive, NVM USB drive, CD-ROM, and/or flash memories are used for storing large amounts of data.

I/O unit 720, in one embodiment, includes a display 721, keyboard 722, cursor control device 723, and communication device 725. Display device 721 may be a liquid crystal device, cathode ray tube ("CRT"), touch-screen display, or other suitable display device. Display 721 projects or displays images of a graphical planning board. Keyboard 722 may be a conventional alphanumeric input device for communicating information between computer system 700 and computer operator(s). Another type of user input device is cursor control device 723, such as a conventional mouse, touch mouse, trackball, or other type of cursor for communicating information between system 700 and user(s).

Communication device 725 is coupled to bus 711 for accessing information from remote computers or servers, such as server or other computers, through wide-area network. Communication device 725 may include a modem or a network interface device, or other similar devices that facilitate communication between computer and network. Computer system 700 may be coupled to a number of servers via a network infrastructure.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 8:
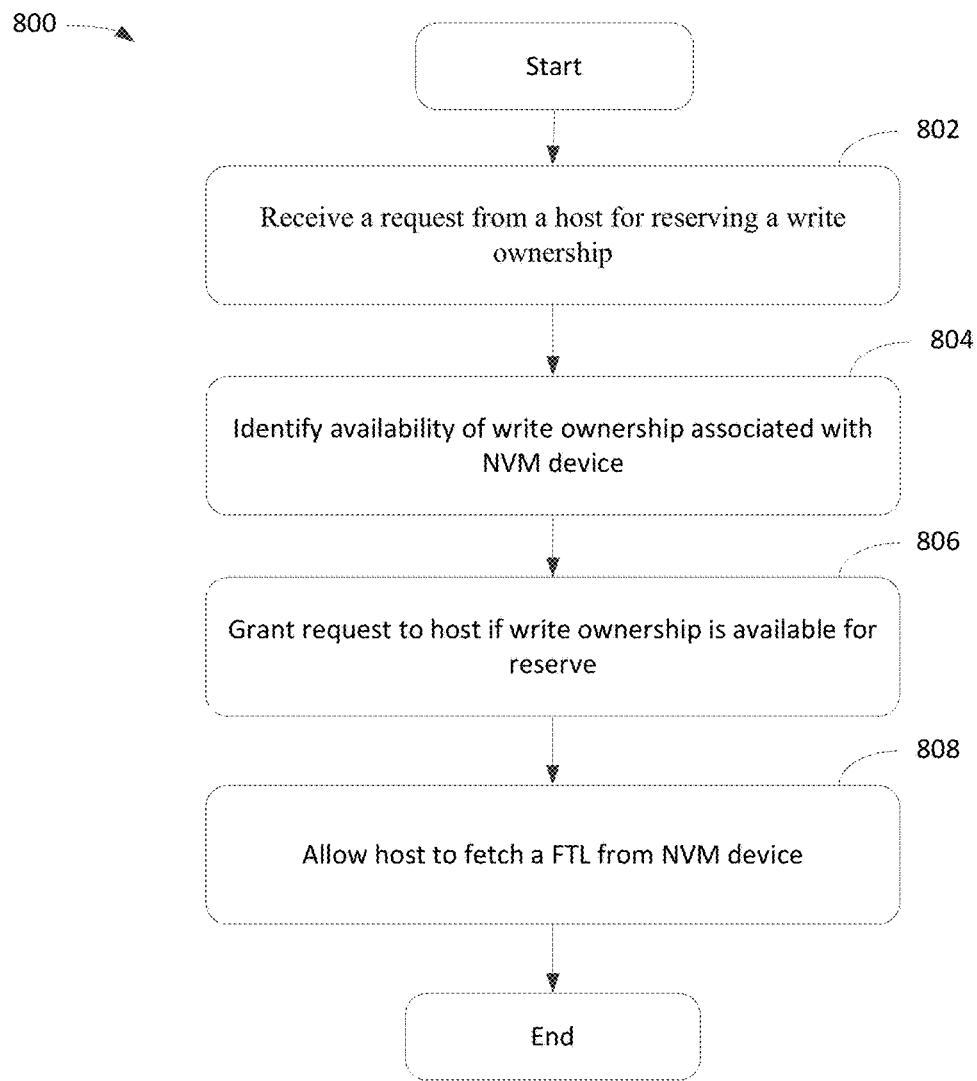
FIG. 8 is a flowchart diagram illustrating a process of reserving a write operation using a distributed FTL caching scheme in accordance with one embodiment of the present invention.

FIG. 8 is a flowchart diagram 800 illustrating a process of reserving a write operation using a distributed FTL caching scheme in accordance with one embodiment of the present invention. At block 802, a process for facilitating a shared NVM system allows an NVM management module to receive a request from a host for reserving a write ownership. The write ownership enables a host or computer to write information to a portion of storage space in an NVM device. For example, an IO write reservation which is a write ownership is initiated by a host and subsequently is forwarded from the host to the NVM controller (or NVM management module) via a switching fabric.

At block 804, the availability of write ownership for reservation associated with the NVM device is identified in accordance with a set of predefined policy stored in the NVM management module. In one embodiment, the process is capable of searching through a reservation table in the NVM management module to determine whether the write ownership has been reserved by other hosts or users. If the NVM device contains multiple FTL versions, the process, in one embodiment, allows the host to load a spare version of FTL snapshot from the NVM device when the NVM device is currently being accessed by other host(s).

At block 806, the NVM management module grants the request to the host if the write ownership is available for reserve. In one example, the NVM management module checks the policy table to ascertain that there is no access restriction between the host and the NVM device. The NVM management module further exams the status table to verify the current write reservation and read reservation associated with the NVM management.

At block 808, the host fetches FTL snapshot and/or FTL table(s) from the NVM device to prepare write operation. In one aspect, an FTL index table is loaded for LBA mapping. The host is subsequently allowed to write information to the portion of storage space in the NVM device. The locally stored FTL snapshot or table is modified in accordance with the information stored in the portion of storage space in the NVM device. In one example, the modified FTL snapshot is saved in the cache in the NVM management module. When the information writing to the NVM device is finished, a notice is sent from the host to the NVM management module indicating that the write operation is completed. Upon instructing the host to replace the FTL snapshot in the NVM device with the locally stored FTL snapshot, a message of new or updated FTL snapshot associated with the NVM device is broadcasted by the NVM management module to other hosts.

Figure 9:
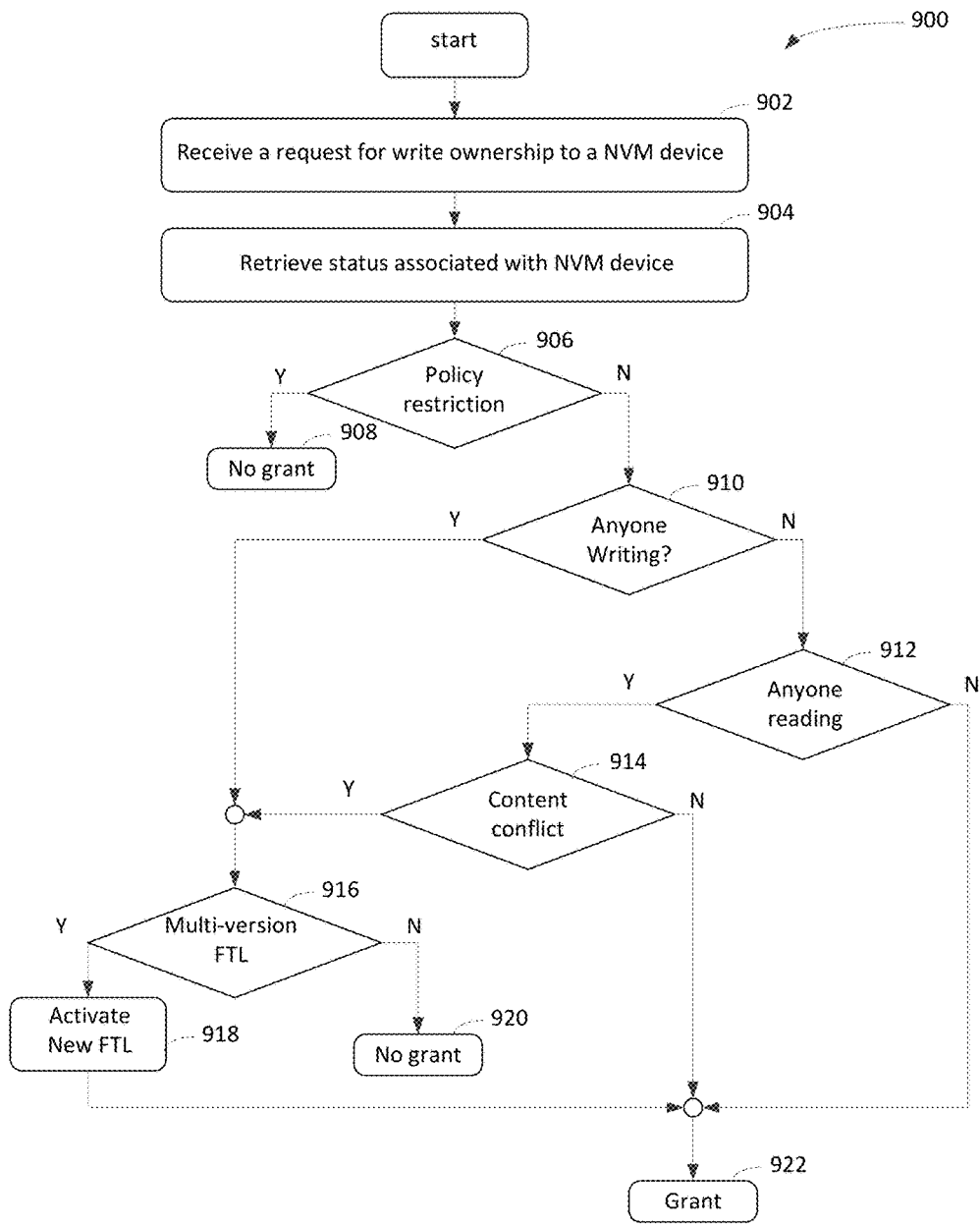
FIG. 9 is a flowchart diagram illustrating an exemplary process of granting a write operation in accordance with one embodiment of the present invention.

FIG. 9 is a flowchart diagram 900 illustrating an exemplary logic process of granting a write operation in accordance with one embodiment of the present invention. The process of a shared NVM system, at block 902, receives a write request from a host via a network requesting a write ownership associated to a portion of storage space in an NVM device. At block 904, the NVM management module or memory controller retrieves a status table and policy table to identify the accessibility associated with the NVM device. At block 906, the process exams whether there is any policy that restricts any access between the NVM device and the host. For example, if the policy specifies that the host is barred from access the NVM device, the request will not be granted, as indicated at block 908. If the policy restriction is not found, the process proceeds to block 910.

If the status table indicates no writing activities, the process proceeds to block 912. Otherwise, the process proceeds to block 916. At block 912, the status table is searched to determine whether there are any reading activities. If there are reading activities, the process proceeds to block 914. Otherwise, the process proceeds to block 922 for granting.

At block 914, the process checks to see whether the reading activities create actual conflicts with the write reservation. For example, reading and writing at the same section of the NVM device would create an actual conflict. If not, the process proceeds to block 922 for granting. Otherwise, the process proceeds to block 916. At block 916, the process exams whether the NVM device contains multiple levels of FTL. If no multiple levels of FTL is found, the process proceeds to block 920 and the request is declined. Otherwise, the process proceeds to block 918 to activate new FTL. It should be noted that new FTL can be used for writing operation while the current FTL is used for reading operation as long as there is no actual data contention. For example, the data contention can occur if writing data and reading data at the same storage location of the NVM device.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for providing a shared non-volatile memory ("NVM") system, comprising:

receiving, by an NVM management module, a first request from a first host for reserving a write ownership for allowing the first host to write information to a portion of storage space in a first NVM device;

identifying availability of the write ownership associated with the first NVM device in accordance with a set of predefined policy stored in the NVM management module;

granting the first request to the first host if the write ownership of the first NVM device is available for reserve; and allowing the first host to fetch a flash translation layer ("FTL") snapshot from the first NVM device.

2. The method of claim 1, further comprising loading FTL index table for IO write and mapping logic block address ("LBA") to NVM physical address.

3. The method of claim 1, further comprising allowing the first host to write information to the portion of storage space in the first NVM device.

4. The method of claim 3, further comprising modifying locally stored FTL snapshot in accordance with the information stored in the portion of storage space in the first NVM device.

5. The method of claim 4, further comprising sending a notice from the first host to the NVM management module to indicate a completion of write operation when writing is finished.

6. The method of claim 5, further comprising instructing the first host to replace the FTL snapshot in the first NVM device with the locally stored FTL snapshot in the first host.

7. The method of claim 6, further comprising broadcasting by the NVM management module a message to other hosts indicating that the first NVM device contains an updated FTL snapshot.

8. The method of claim 1, wherein receiving, by an NVM management module, a first request from a first host includes forwarding a first IO write reservation from the first host to the NVM controller via a switching fabric.

9. The method of claim 1, wherein identifying availability of the write ownership associated with the first NVM device includes searching through a reservation table stored in the NVM management module to determine whether the write ownership has been reserved by other hosts.

10. The method of claim 1, wherein identifying availability of the write ownership associated with the first NVM device includes allowing the first host to load a spare version of FTL snapshot from the first NVM device when current reservation for write ownership is not available to the first host.

11. The method of claim 1, further comprising:
receiving a second request from a second host for reserving a write ownership for allowing the second host to write information to a portion of storage space in a second NVM device;
identifying availability of the write ownership associated with the second NVM device in accordance with a set of predefined policy stored in the NVM management module;
granting the second request to the second host if the write ownership is available for reserve; and
allowing the second host to fetch a FTL snapshot from the second NVM device.

12. A shared non-volatile memory ("NVM") system configured to store information persistently, comprising:
a plurality of hosts, able to process and store data, configured to provide interfaces with a plurality of users;
a switching fabric coupled to the plurality of hosts and configured to provide connections;
a plurality of NVM devices coupled to the switching fabric and configured to store information persistently; and
an NVM management module coupled to the switching fabric and configured to manage granting of write ownerships associated with the plurality of NVM devices, which allows a flash translation layer (FTL) snapshot to be fetched by one of the plurality of hosts from one of the plurality of NVM devices, in response to a plurality of requests initiated by the plurality of hosts.

13. The system of claim 12, wherein the plurality of hosts includes computers, laptops, portable devices, servers, or smartphones.

14. The system of claim 12, wherein the switching fabric includes interconnections between NVM devices and hosts and the plurality of NVM devices includes flash memory devices.

15. The system of claim 12, wherein the NVM management module is a memory controller capable of providing write control and read access to the plurality of NVM devices.

16. The system of claim 12, wherein the NVM management module is a memory controller capable of providing read access associated with the plurality of NVM devices in response to a plurality of requests initiated by the plurality of hosts.

17. The system of claim 12, wherein the NVM management module is configured to facilitate a shared NVM storage between multiple hosts utilizing a distributed flash translation layer ("FTL") cache scheme.

18. A method for providing a shared non-volatile memory ("NVM") system, comprising:
receiving a read request from a first host via a network requesting a read access to a first portion of storage space in a first NVM device;
identifying accessibility of read access associated with the first NVM device in accordance with a set of predefined read policy stored in a memory controller;
receiving a write request from a second host for reserving a write ownership for allowing the second host to write information to a second portion of storage space in the first NVM device;
identifying availability of the write ownership associated with the first NVM device in accordance with a set of predefined write policy stored in the memory controller; and
granting the write request to the second host based and allowing the second host to update a spare version of flash translation layer ("FTL") snapshot from the first NVM device when the first NVM device is accessed by the first host.

19. The method of claim 18, further comprising instructing the second host to replace the FTL snapshot in the first NVM device with the locally stored FTL snapshot in the second host.

20. The method of claim 18, further determining the availability of the write ownership associated with the first NVM device in accordance with status associated with the first NVM device recorded in a status table in the memory controller.

* * * * *